United States Patent [19]

Catchpole et al.

[11] Patent Number: 4,484,336

[45] Date of Patent: Nov. 20, 1984

[54] DIGITAL TRANSMISSION SYSTEMS

[75] Inventors: Richard J. Catchpole, Bishop's Stortford; Peter J. Dyke, Stansted; Brian S. Farley, Bishop's Stortford; Harbhajan S. Virdee, Harlow, all of England

[73] Assignee: International Standard Electric Corporation, New York, N.Y.

[21] Appl. No.: 380,789

[22] Filed: May 21, 1982

[30] Foreign Application Priority Data

Jun. 4, 1981 [GB] United Kingdom ............... 8117139

[51] Int. Cl.³ .............................................. H04B 3/36
[52] U.S. Cl. ........................................ 375/4; 375/58; 179/170 R
[58] Field of Search ............................ 375/3, 4, 36, 58; 178/70 R; 179/170 R, 170 HF, 170.8; 455/7, 10; 370/97, 75

[56] References Cited

U.S. PATENT DOCUMENTS 3,304,508 2/1967 Danielsen et al. ............... 178/70 R
3,651,265 3/1972 Van Der Houwen ........... 178/70 R
3,980,973 9/1976 Hecken ............................ 178/70 R
4,078,157 3/1978 Lender et al. ........................ 375/4

Primary Examiner—Robert L. Griffin
Assistant Examiner—Stephen Chin
Attorney, Agent, or Firm—John T. O'Halloran; Alfred C. Hill

[57] ABSTRACT

Feedback equalization is employed for digital repeaters of transmission systems having twisted-wire pairs, in order to reduce intersymbol interference while minimizing near-end crosstalk gain. Previously the incoming signal was selectively amplified at the higher frequencies in order to negate intersymbol interference, with subsequent near-end crosstalk gain. According to the present invention the intersymbol interference element of an incoming signal is cancelled, prior to amplification in an adder by a compensation signal derived from the output signal of a regenerator and a retimer. An output stage serves to amplify and shape the resultant signal to a form suitable for transmission. The compensation signal comprises the inverted output of a filtering and scaling network.

22 Claims, 4 Drawing Figures

DIGITAL TRANSMISSION SYSTEMS

BACKGROUND OF THE INVENTION

The present invention relates to digital information transmission systems including twisted wire pair transmission lines, and in particular to equalization for digital repeaters in the presence of near-end crosstalk.

It is well known that a transmission system involving transmission over symmetric (balanced) wire pairs requires repeaters to be placed at intervals, typically less than 2 km (kilometers) apart. Such repeaters reduce signal distortion by equalization, and by employing amplification restore the signal to a suitable level for retransmission well above the level of the near-end crosstalk from other systems using the same route. FIG. 1 of the accompanying drawing shows a section of such a route in which a repeater 1 transmits high amplitude signals into a symmetric wire pair 3 at point 2. These signals are attenuated while travelling down the wire pair 3 to point 4, where they are received by a subsequent repeater 5. A repeater 6 transmitting at point 7 into another symmetric wire pair 8, in the opposing direction and towards point 9 and a repeater 10, will induce crosstalk into the aforementioned signals near point 4. This crosstalk is near-end crosstalk coupling due to imperfect balance of the cable pairs and is indicated in FIG. 1 by a curved arrow between points 7 and 4. A similar coupling occurs between points 2 and 9. Other crosstalk mechanisms may also exist. For example, near-end crosstalk can occur between systems transmitting in the same direction if transmitted and received signals come within close proximity to each other.

For a digital system the functions of each repeater are usually to re-amplify, regenerate and retime the symbols being transmitted. Conventionally, the function of re-amplification involves equalization (inversion) of the linear filtering effect of the cable pair such that the subsequent pulse spectrum has a predetermined shape meeting Nyquist's criterion for no intersymbol interference. The intersymbol interference is negated by selectively amplifying the higher frequencies by the magnitude of attenuation suffered by them in transmission. As the attenuation of the cable pair increases with frequency, the gain of the re-amplification function correspondingly increases with frequency, at least up to a frequency of approximately one half of the symbol rate. This increasing of gain with frequency is unfortunate, since it simultaneously amplifies crosstalk, while the coupling mechanism producing the crosstalk deteriorates with increasing frequency.

SUMMARY OF THE INVENTION

An object of the present invention is to provide a digital transmission system having reduced intersymbol interference for an incoming signal while minimizing near-end crosstalk gain.

Another object of the present invention is to provide a digital repeater having reduced intersymbol interference for an incoming signal while minimizing near-end crosstalk gain.

A feature of the present invention is the provision of a digital transmission system comprising a twisted-wire pair transmission line; and at least one digital repeater coupled to the transmission line, the repeater including feedback means to reduce intersymbol interference is an incoming signal while minimizing near-end crosstalk gain.

Another feature of the present invention is the provision of a digital repeater for use with twisted-pair transmission lines comprising feedback means to reduce intersymbol interference in an incoming signal while minimizing near-end crosstalk gain.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
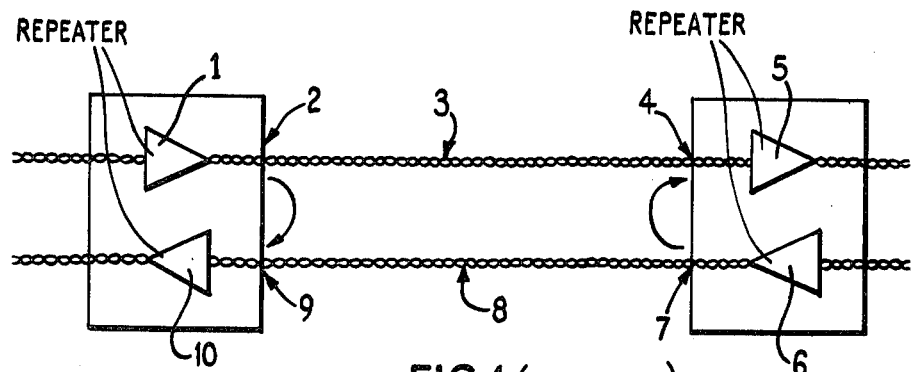
FIG. 1 is a block diagram of a section of a known transmission system having symmetric wire pairs and repeaters described hereinabove under the heading "Background of the Invention"
Figure 2:
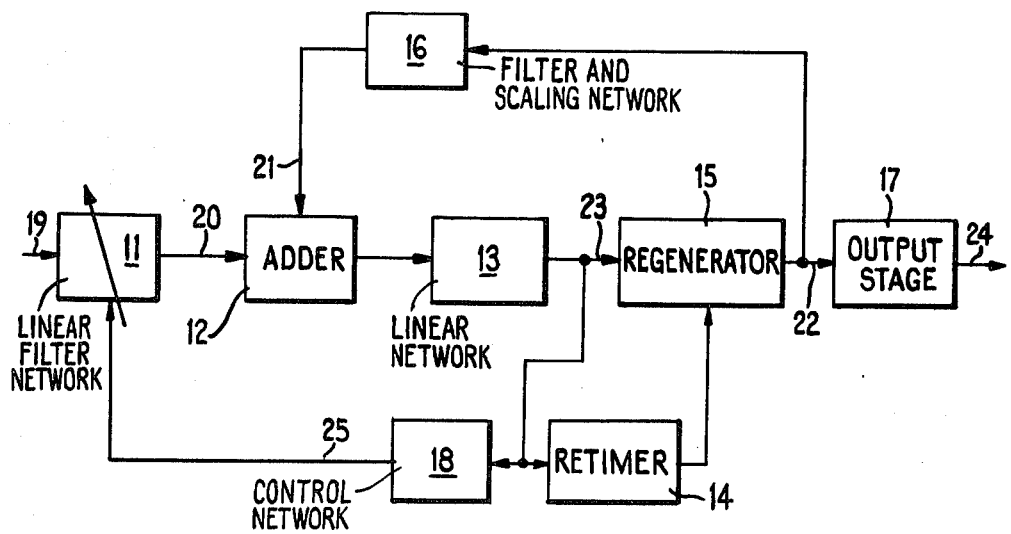
FIGS. 2, 3 and 4 are simplified block diagrams of three different embodiments of a digital repeater circuit arrangement in accordance with the principles of the present invention.

FIG. 2 shows a basic repeater circuit arrangement including a linear network 11 followed by an adder 12, a second linear network 13 whose output is connected to a retimer 14, regenerator 15, and a control network 18. Regenerator 15 has its output connected to a network 16 and an output driver (output stage) 17. Thus, an input signal with crosstalk at 19 is filtered by network 11, and the filtered signal at 20 is applied to adder 12 which sums it with an inverted replica of the signal at 21, which is the output signal (regenerated signal) at 22 of regenerator 15 when filtered and scaled by network 16. The output signal of adder 12 is applied to network 13 which is such as to produce a signal at 23 suitable to feed regenerator 15, and also feed retimer 14 comprising the usual arrangement of a linear network followed by a non-linear network, such as full-wave rectifier, and a further linear network of a resonant variety. The output signal at 22 of regenerator 15 is amplified and shaped by output stage 17 to form a signal at 24 suitable to be transmitted to line and to buffer the effects of different impedances of different pairs from the signal through network 16. Alternatively, network 16 can include its own buffering function. Finally, the signal at 23 before regeneration is sensed by the control network 18, typically including a high impedance peak detector followed by a low pass network, to produce a direct current at 25 that can affect the linear characteristics of network 11 prior to the point of entry of the signal at 21. This has the advantage that all properties of most signals in the repeater, such as that of regenerator 15, remain constant. It has the disadvantage, however, that the crosstalk spectrum of the signal at 23 depends on the pair length and cannot be optimally chosen for more than one length, such as the maximum.

Figure 3:
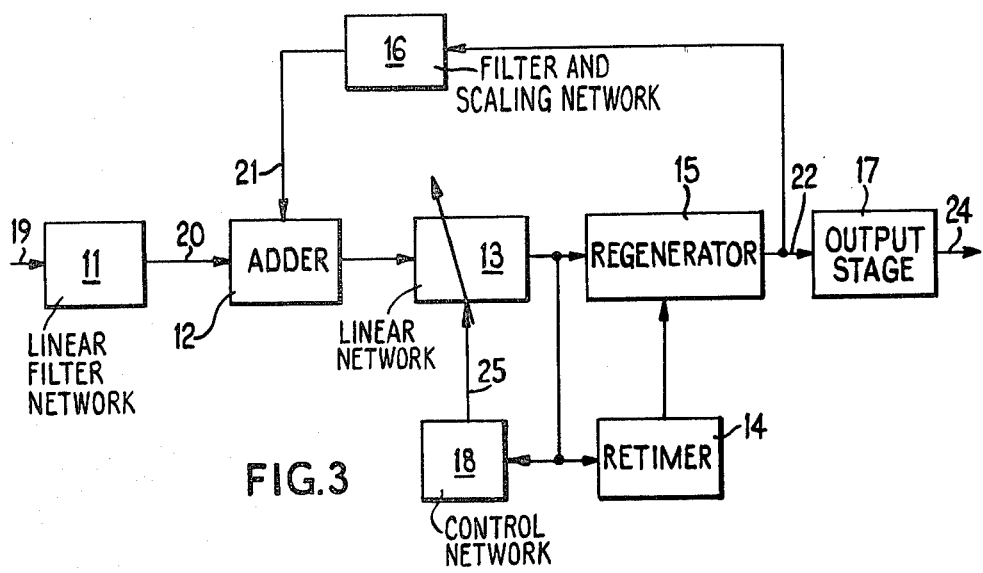

The embodiment of FIG. 3 differs from FIG. 2 only in that the network under control is network 13, that is after the point of entry of the signal at 21. This may be useful where the cancellation/reduction techniques are required to be effective on the longest lines, but not where crosstalk amplification is to be reduced also on short lines.

Figure 4:
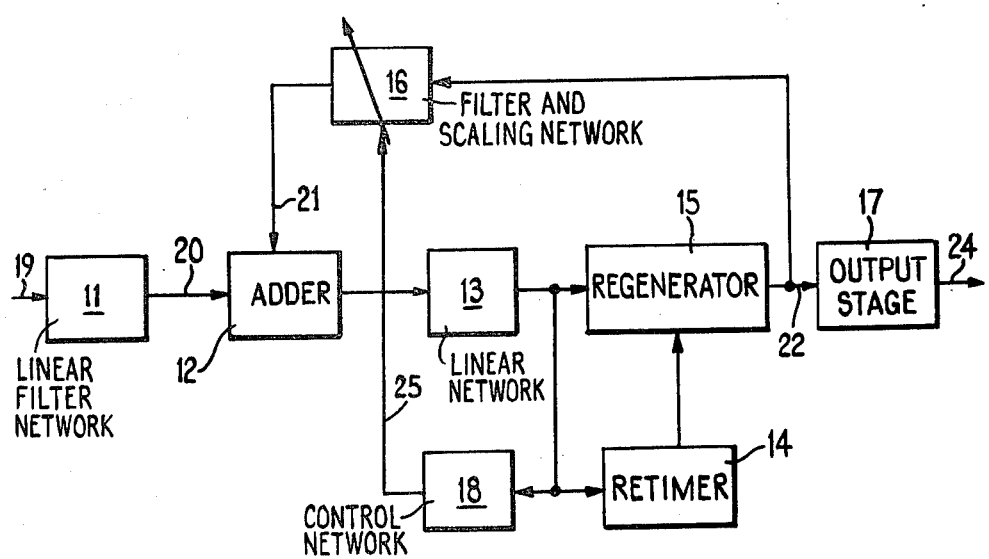

In the embodiment of FIG. 4, the network under control is network 16, that is affecting the signal at 21 itself. This results in the near-end crosstalk spectrum at entry to the regenerator 15 being independent of pair length, but with signal properties at this point that do vary with pair length.

Practical application may thus benefit from an appropriate combination of the embodiments of FIGS. 2, 3 and 4.

The network 16 should, preferably, be chosen in such a way that the signal passed to the non-linear circuit in the retimer 14 has the required properties to minimize pattern dependent jitter (e.g. a pulse shape that is symmetric in time or whose spectrum is symmetrically disposed about a frequency equal to half the symbol rate in the frequency domain). The signal at 21 caused by a symbol must be small or nil until the corresponding signal at 20 is considerable and regeneration is complete. Therefore, the properties for low jitter are achieved by ensuring that the signal at 21 after bus time has then the shape that, when added to the signal at 20, produces the required symmetry.

When regeneration occurs incorrectly, perhaps due to an exceptionally large crosstalk transient, an incorrect signal flows through network 16, causing distortion that will tend to encourage subsequent errors. This error multiplication effect is dependent on the choice of networks 11, 13 and 16. Preferably, network 16 has a low-pass characteristic that can result in a situation where following an error, typically only one additional error occurs.

In the method of the present invention there is no attempt to introduce re-amplification necessary to cancel the pair attenuation as in the conventional method to meet Nyquist's above-mentioned criterion. Rather, intersymbol interference is cancelled by means of a compensation signal derived from the output of the regeneration and retiming functions as illustrated, for example, in FIG. 2. For example, a system carrying a 2048 Kbit/s multiplex of 30 telephony channels and employing AMI, HDB3, 4B-3T or a similar line code can with the techniques described above achieve, on the same cable type, greater cable section length, a greater number of channels on each system, or a combination of these.

The embodiments described above include automatic compensation for different lengths of the cable section, and involve automatic control of a network or networks such that the signal entering the regeneration function remains unchanged in its important properties, such as amplitude, and ensures freedom from intersymbol interference.

Typically, the linear network 11 in FIG. 2 is formed by an equalizer, comprising one or more resonant bridged T sections, followed by an automatic line build out circuit. This last circuit can include filter sections in which each of several resistance elements is created by the slope resistance of a diode through which the control current 25 is passed. If the signals at 20 and 21 can be from current sources the adder 12 can be simply a common impedence through which those currents are passed. The linear network 13 can be an amplifier, and its gain may be arranged to vary with frequency in order to fulfill part of the equalization and pulse shaping functions. The retimer 14, regenerator 15 and output stage 17 can be as described in Chapter 14 and earlier chapters of "Digital Transmission Systems", Revised 2nd Edition by P. Bylanski and D. G. W. Ingram, Peter Peregrinus, 1980, ISBN 0906048427. The filtering and scaling network 16 may be a simple low pass network comprising a series resistance followed by a shunt capacitance, together with any necessary a.c. (alternating current) coupling. The control network 18 may be a peak detector formed by a half wave rectifier followed by a large capacitance with large shunt resistance whose potential difference is used to drive a current source.

While we have described above the principles of our invention in connection with specific apparatus, it is to be clearly understood that this description is made only by way of example and not as a limitation to the scope of our invention as set forth in the objects thereof and in the accompanying claims.

I claim:

1. A digital transmission system comprising:
   a twisted-wire pair transmission line; and
   at least one digital repeater coupled to said transmission line having an arrangement to reduce intersymbol interference in an incoming signal while minimizing near-end crosstalk gain, said arrangement including
   a pulse regenerator and a retimer network having an input and an output,
   an adder having two inputs and an output,
   a feedback network coupled to said output of said regenerator and retimer network to produce a compensation signal, said compensation signal being coupled to one of said two inputs of said adder,
   an additional network disposed between said output of said adder and said input of said regenerator and retimer network to provide a suitable input signal for said regenerator and retimer network,
   a filter network coupling said incoming signal to the other of said two inputs of said adder, and
   a control network coupled to said input of said regenerator and retimer network and at least a selected one of said feedback network, said additional network and said filter network.

2. A system according to claim 1, wherein said repeater further includes
   an output network coupled to said output of said regenerator and retimer network to form a signal suitable for transmission on said transmission line and to buffer said feedback network from the effects of the impedance of said transmission line.

3. A digital repeater for use with a twisted-pair transmission line to reduce intersymbol interference in an incoming signal while minimizing near-end crosstalk gain comprising:
   a pulse regenerator and a retimer network having an input and an output,
   an adder having two inputs and an output,
   a feedback network coupled to said output of said regenerator and retimer network to produce a compensation signal, said compensation signal being coupled to one of said two inputs of said adder,
   an additional network disposed between said output of said adder and said input of said regenerator and retimer network to provide a suitable input signal for said regenerator and retimer network,
   a filter network coupling said incoming signal to the other of said two inputs of said adder, and
   a control network coupled to said input of said regenerator and retimer network and at least a selected one of said feedback network, said additional network and said filter network.

4. A repeater according to claim 3, further including an output network coupled to said output of said regenerator and retimer network to form a signal suitable for transmission on said transmission line and to buffer said feedback network from the effects of impedance of said transmission line.

5. A system according to claim 1, wherein
a control signal output of said control network controls said filter network.

6. A system according to claim 1, wherein
a control signal output of said control network controls said feedback network.

7. A system according to claim 1, wherein
a control signal output of said control network controls said filter network and said feedback network.

8. A system according to claim 1, wherein
a control signal output of said control network controls said additional network.

9. A system according to claim 1, wherein
a control signal output of said control network controls said filter network and said additional network.

10. A system according to claim 1, wherein
a control signal output of said control network controls said feedback network and said additional network.

11. A system according to claim 1, wherein
a control signal output of said control network controls said feedback network, said filter network and said additional network.

12. A repeater according to claim 3, wherein
said output network prevents impedance variations of said transmission lines from affecting said compensation signal.

13. A repeater according to claim 3, wherein
said feedback network prevents impedance variations of said transmission lines from affecting said compensation signal.

14. A repeater according to claim 3, wherein
said control network has a low-pass characteristic to limit error multiplication.

15. A repeater according to claim 3, wherein
said control network has a high frequency characteristic to minimize generation of pattern dependent jitter in said retimer of said regenerator and retimer network.

16. A repeater according to claim 3, wherein
a control signal output of said control network controls said filter network.

17. A repeater according to claim 3, wherein
a control signal output of said control network controls said feedback network.

18. A repeater according to claim 3, wherein
a control signal output of said control network controls said filter network and said feedback network.

19. A repeater according to claim 3, wherein
a control signal output of said control network controls said additional network.

20. A repeater according to claim 3, wherein
a control signal output of said control network controls said filter network and said additional network.

21. A repeater according to claim 3, wherein
a control signal output of said control network controls said feedback network and said additional network.

22. A repeater according to claim 3, wherein
a control signal output of said control network controls said feedback network, said filter network and said additional network.

* * * * *